United States Patent
Hottes et al.

(10) Patent No.: US 10,929,884 B2
(45) Date of Patent: Feb. 23, 2021

(54) SYSTEM AND METHOD FOR PREVENTING A DELIVERY OF ADVERTISING CONTENTS

(71) Applicant: Ad-IP GmbH & Co. KG, Zossen (DE)

(72) Inventors: Dirk Hottes, Bendestorf (DE); Sascha Hottes, Hamburg (DE)

(73) Assignee: Ad-IP GmbH & Co. KG, Zossen (DE)

( * ) Notice: Subject to any disclaimer, the term of this patent is extended or adjusted under 35 U.S.C. 154(b) by 302 days.

(21) Appl. No.: 15/222,174

(22) Filed: Jul. 28, 2016

(65) Prior Publication Data
US 2016/0335669 A1 Nov. 17, 2016

Related U.S. Application Data

(63) Continuation of application No. PCT/EP2015/051918, filed on Jan. 30, 2015.

(30) Foreign Application Priority Data

Jan. 30, 2014 (DE) .................... 10 2014 101 174.0

(51) Int. Cl.
*G06Q 30/02* (2012.01)
*G06F 16/957* (2019.01)

(52) U.S. Cl.
CPC ....... *G06Q 30/0257* (2013.01); *G06F 16/957* (2019.01); *G06Q 30/0277* (2013.01)

(58) Field of Classification Search
None
See application file for complete search history.

(56) References Cited

U.S. PATENT DOCUMENTS 6,256,739 B1 * 7/2001 Skopp ................ G06F 21/31
709/229
8,527,504 B1 * 9/2013 Krishnamurthy ..................
G06F 17/30905
707/722

(Continued)

FOREIGN PATENT DOCUMENTS

WO 2011/119676 A1 9/2011

OTHER PUBLICATIONS

Jussi-Pekka Erkkilä, The Websocket Security Analysis, Aalto University School of Science, 2012, http://juerkkil.iki.fi/files/writings/Websocket2012.pdf (Year: 2012).*

(Continued)

*Primary Examiner* — Christopher B Tokarczyk
(74) *Attorney, Agent, or Firm* — Myers Wolin, LLC (57) ABSTRACT

A method is provided for preventing delivery of advertising content server device to a client device, where an advertising blocker monitors attempts of the client device to establish a connection to the server device, in the event of a detected attempt to establish a connection, determines if the WebSocket protocol is used for the attempt to establish a connection, if the WebSocket protocol is used for the attempt to establish a connection, checks, for the URI of the attempt to establish a connection, and if the URI may be used to establish a connection, and if the result of the check is that the URI may not be used to establish a connection, ends the attempt to establish a connection. Also provided is a client device for displaying electronic documents, wherein the client device has an advertising blocker designed to implement the method described.

11 Claims, 3 Drawing Sheets

(56) References Cited

U.S. PATENT DOCUMENTS

| | | | |
|---|---|---|---|
| 8,527,774 B2 | 9/2013 | Fallows et al. | |
| 2003/0088633 A1* | 5/2003 | Chiu | H04L 29/06 709/206 |
| 2003/0153302 A1* | 8/2003 | Lewis | G06Q 20/102 455/412.1 |
| 2003/0233483 A1 | 12/2003 | Skrepetos | |
| 2006/0235960 A1 | 10/2006 | Lai et al. | |
| 2010/0306547 A1 | 12/2010 | Fallows et al. | |
| 2012/0284801 A1* | 11/2012 | Goodwin | G06Q 30/02 726/26 |
| 2013/0132211 A1 | 5/2013 | Tsai et al. | |

OTHER PUBLICATIONS

Karlström ("The WebSocket Protocol and Security: Best Practices and Worst Weaknesses," Master's Thesis, University of Oulu, Department of Information Processing Science, Dec. 14, 2015) (Year: 2015).*

International Search Report issued for corresponding International Application No. PCT/EP2015/051918 dated Jun. 25, 2015.

English translation of the German Search Report issued for corresponding German Patent Application No. 10 2014 101174.0 dated Mar. 5, 2015.

Anonymous, "Firewall", URL: <http://de.wikipedia.org/w/index.php?title=Firewall&oldid=126432695>, Wikipedia, Jan. 13, 2014, with an English translation.

Cisco Systems, "PIX/ASA URL Filtering Configuration Example", Document ID: 97277, URL: <http://www.cisco.com>, Cisco Sytems, Inc., Oct. 10, 2008.

Anonymous, "Application firewall", URL: <https://en.wikipedia.org/wiki/Application_firewall>, Wikipedia, Jan. 4, 2014.

Fette et al., "The WebSocket Protocol", RFC 6455, Standards Track, ISSN: 2070-1721, pp. 1-71, Internet Engineering Task Force (IETF), Dec. 2011.

Anonymous, "Event (programming)", URL: <https://de.wikipedia.org/w/index.php?title=Ereignis_(Programmierung) & oldid = 116865717>, Wikipedia, Apr. 3, 2013, with an English translation.

Anonymous, "Adblock Plus—Features", p. 1 (paragraph 1), URL: <http://web.archive.org/web/20130224192853/http://adblockplus.org/en/features>, Internet Archive, Feb. 24, 2013.

Anonymous, "FAQ—Adblock Plus internals", p. 1 (paragraph 4-5), p. 2 (paragraph 3), URL: <http://web.achive.org/web/20130309011531/http://adblockplus.org/en/faq_internal>, Internet Archive, Mar. 9, 2013.

Anonymous, "WebSocket", pp. 1-7, URL: <https://en.wikipedia.org/w/index.php?title=WebSocket&oldid=592573833>, Wikipedia, Jan. 27, 2014.

Summons for Oral Hearing issued for corresponding European Application No. 10 2014101 174.0 dated May 14, 2019, with an machine-generated English translation.

* cited by examiner

SYSTEM AND METHOD FOR PREVENTING A DELIVERY OF ADVERTISING CONTENTS

CROSS REFERENCE TO RELATED APPLICATIONS

This application is a continuation of International Application No. PCT/EP2015/051918, filed on Jan. 30, 2015, which claims priority to German Application No. 10 2014 101 174.0, filed Jan. 30, 2014, the contents of each of which are incorporated by reference herein.

TECHNICAL FIELD

The invention relates to a method and a system for preventing a delivery of advertising contents and/or advertising means, which are intended for being displayed at client software, as a browser, in an electronic document, or as a webpage.

BACKGROUND

It is generally known to insert advertising contents or advertising means into electronic documents, as webpages. The operator of the website may generate additional income by inserting the advertising contents, for example, if a user of the webpage clicks on the advertisement. Content providers publishing their contents on webpages, in most cases finance themselves by means of the additionally inserted advertisements on the webpage.

In most cases, the providers of such webpages do not manage the inserted advertisements themselves, but rather obtain the latter from an external marketer for advertising means or advertising contents, who holds the available advertising means and advertising contents on a server for advertising means on request. The provider of the website only has to insert a reference to the advertising content on the advertising means server to be displayed into the webpage such that upon request of the webpage, for example, in an internet browser, the webpage of the web server of the provider of the webpage and the advertising contents of the advertising means server of the advertising means marketer is loaded.

The loading of the advertising contents from the advertising means server of the advertising means marketer may be carried out by using a WebSocket protocol. Hereby, the webpage is loaded in a conventional manner using the HTTP protocol from the Web server. During the loading of the webpage or after the loading of the webpage, a script integrated into the webpage may load the web contents to be displayed by using the WebSocket protocol of an advertising means server, and may display it within the loaded webpage.

Hereby, however, it may be disadvantageous that the advertising content is also faded in, if the user requesting the webpage does not want to see the advertising content at all in order to, for example, reduce the amount of data to be transmitted.

Further, it is known to provide webpages without advertising means or advertising contents to paying users. As far as the webpages, however, may also be requested by non-paying users, this has the disadvantage that the webpages have to be made available in two versions, namely, in a version without advertising content and in a version with advertising content. This involves an increased expense for the maintenance of the webpages. On the user side, the disadvantage appears that the paying user has to authenticate himself with the provider of the webpages such that the provider of the webpages may decide, whether the requested webpage may be delivered with or without advertising content. This may be carried out, for example, by means of a log-in of the user. Alternatively, for example, so called cookies may be stored at the client means of the user, which may be read by the provider of the website, and which may comprise information as to whether a requested webpage is to be delivered with or without advertising content. In case such cookies are not available, for example, because the user does not allow the storage of cookies on his client means, in case of doubt, the webpages requested by the user are always delivered with advertising contents, even if the user does not want to have these advertising contents.

Therefore, it is an object of the present invention to provide a system and a method, which at least partially avoid the disadvantages known from prior art, and which enable to prevent and/or to control the insertion of advertising means or advertising contents in an electronic document, as a webpage, in a simple and reliable manner.

SUMMARY

This object is solved according to the invention by a method, a client device, and a data transmission device according to the independent claims. Preferred embodiments and further developments of the invention are defined in the respective dependent claims.

Accordingly, a method for preventing a delivery of advertising contents and/or advertising means from a server device to a client device is provided, wherein an advertising blocker of the client device (a) monitors attempts of the client device to establish a connection to the server device, (b) in the event of a detected attempt to establish a connection, determines whether a communications protocol is used for the attempt to establish a full-duplex connection between the server device and the client device, (c) if a communications protocol is used for the attempt to establish a connection being provided for a full-duplex connection, checks, for the Uniform Resource Identifier of the attempt to establish a connection, whether it may be used to establish a connection, and (d) if the result of the check is that the Uniform Resource Identifier (URI) may not be used to establish a connection, ends the attempt to establish a connection, and otherwise allows the attempt to establish a connection to the server device.

Further, a method for preventing a delivery of web contents and/or web material from a server device to a client device via a communications connection is provided, wherein, for the communications connection, a communications protocol is used, which provides a full-duplex connection between the server device and the client device, wherein an advertising blocker of the client device (a) during an attempt to establish a connection, for which the communications protocol is used, checks between the client device and the server device, whether the Uniform Resource Identifier (URI), which is used for the attempt to establish a connection, may be used to establish the connection, and (b) if the result of the check is that the Uniform Resource Identifier (URI) is not allowed to be used for the establishment of the connection, ends the attempt to establish a connection or interrupts a connection which already has been established.

According to the invention, it is particularly advantageous, if the communications protocol is the WebSocket protocol.

On the other hand, a half-duplex connection may be established by means of the HTML protocol.

The advertising blocker of the client device may (a) monitor attempts to establish a connection of the client device to the server device, (b) in the event of a detected attempt to establish a connection, determine whether the WebSocket protocol is used for the attempt to establish a connection, (c) if the WebSocket protocol is used for the attempt to establish a connection, check, for the Uniform Resource Identifier (URI or URL) of the attempting device to establish a connection, whether said Uniform Resource Identifier may be used to establish a connection, and (d) if the result of the check is that the Uniform Resource Identifier may not be used to establish a connection, end the attempt to establish a connection, and otherwise allow the connection establishment attempt to the server device.

Thereby, the transmission of advertising means or advertising contents from a server device to a client device is prevented, if for the request of the advertising contents the WebSocket protocol (or another communications protocol enabling a full-duplex connection) is used, and the address for the server device, which provides the advertising contents, may not be used for a request of advertising contents. Thereby, according to the invention, already the establishment of the connection to the server device is prevented such that the advertising contents is not transmitted to the client device at all, thereby substantially reducing the amount of data to be transmitted to the client device.

The monitoring of the attempts to establish a connection can be carried out by an event listener, which has been registered at the client device for the connection establishment events.

The advertising blocker may, if for the attempt to establish a connection, other than the WebSocket protocol is used, allow the attempt to establish a connection to the server device. Thereby, it is ensured that only such advertising contents are not transmitted to the client device, which are requested by using the WebSocket protocol.

According to an embodiment of the method according to the invention, the advertising blocker in a step, may check, if attempts to establish a connection are allowed generally, and if this check is positive, the advertising blocker may allow the attempt to establish a connection to the server device.

During the check, if attempts to establish a connection are allowed generally, a unique identifier stored in the client means may be transmitted to a third party server, and, as response to the transmitted unique identifier, a return message may be received from the third party server comprising information on whether the check is positive. The unique identifier may, for example, comprise user identification.

During the check, whether the Uniform Resource Identifier of the attempt to establish a connection may be used for the establishment of the connection, a global filter check may be carried out by means of which it is determined, whether the Uniform Resource Identifier meets one or more global filtering rules, and, if the result of the global filter check is positive, the attempt to establish a connection may be terminated.

According to an embodiment of the invention, during the global filter check, the Uniform Resource Identifier may be transmitted to a server device, in which the global filtering rules are stored. A message may be received from this server device comprising information on whether the Uniform Resource Identifier meets one or more global filtering rules.

According to an embodiment of the invention, during the check, whether the Uniform Resource Identifier of the attempt to establish a connection may be used for the establishment of the connection, a local filter check may be carried out according to which it is determined, whether the Uniform Resource Identifier meets one or more filtering rules, and, if the result of the local filter check is positive, the attempt to establish a connection may be terminated. The local filtering rules may be stored in the client device.

According to a preferred embodiment, the global filter check is carried out prior to the local filter check. Thereby, for example, higher weight may be put on the local filter check than on the global filter check. For example, from the global filter check it may be revealed that a Uniform Resource Identifier may not be used for an attempt to establish a connection, while the local filter check provides the result that exactly this Uniform Resource Identifier may be used for an attempt to establish a connection. Hereby, the result of the local filter check may be preferred.

The server device may comprise an advertising means server and/or a socket server which are adapted to establish a socket connection to the client device.

According to a preferred embodiment of the invention, the advertising blocker may comprise a plug-in, and in particular, a plug-in of an internet browser and/or a toolbar, in particular, a toolbar of an internet browser.

Further, a client device is provided comprising an advertising blocker being configured to carry out the method according to the invention.

Further, a client device for displaying electronic documents, in particular, HTML documents, is provided, wherein the client device comprises an advertising blocker being configured so as to (a) monitor attempts to establish a connection of the client device to a server device, (b) in the event of a detected attempt to establish a connection, determine whether a communications protocol is used for the attempt to establish a connection, which is provided for the establishment of a full-duplex connection between the server device and the client device, (c) if a communications protocol is used for the attempt to establish a connection being provided for the establishment of a full-duplex connection, check, for the Uniform Resource Identifier (URL) of the attempt to establish a connection, whether it may be used for the establishment of a connection, and (d) if the result of the check is that the Uniform Resource Identifier (URI) may not be used to establish the connection, end the attempt to establish a connection, and otherwise allow the attempt to establish a connection to the server device.

Further, a client device for displaying electronic documents, in particular, HTML documents, is provided, wherein the client device comprises an advertising blocker being configured such that it (a) during an attempt to establish a connection between the client device and the server device, for which the communications protocol is used being provided for the establishment of a full-duplex connection between the server device and the client device, checks, whether the Uniform Resource Identifier (URI), which is used for the attempt to establish a connection, may be used to establish the connection, and (b) if the result of the check is that the Uniform Resource Identifier (URI) is not allowed to be used for the establishment of the connection, ends the attempt to establish a connection or interrupts a connection which already has been established.

Also here, it is advantageous, if the communications protocol is the WebSocket protocol.

The client device may comprise an internet browser and/or a mobile internet browser, wherein the advertising blocker may be configured as plug-in and/or as toolbar of the internet browser and/or mobile internet browser.

The client device may be a personal computer, a smartphone, a tablet computer, a notebook, or a portable or stationary apparatus for displaying electronic documents.

Further, a data storage device is provided by the invention comprising data stored thereon, or providing a signal sequence representing data suitable for transmission via the internet, wherein the data represents an advertising blocker program for being executed on a client device for display of electronic documents, wherein the advertising blocker program is configured such that it (a) monitors attempts to establish a connection of the client device to a server device, (b) in the event of a detected attempt to establish a connection, determines whether the WebSocket protocol is used for the attempt to establish a connection, (c) if the WebSocket protocol is used for the attempt to establish a connection, checks, for the Uniform Resource Identifier of the attempt to establish a connection, whether it may be used to establish a connection, and (d) if the result of the check is that the Uniform Resource Identifier may not be used to establish a connection, ends the attempt to establish a connection, and otherwise allows the connection attempt to establish a connection to the server device.

The data storage device or the advertising blocker program may be further adapted such that the advertising blocker program executes the method according to the invention.

BRIEF DESCRIPTION OF THE DRAWINGS

Further details and features of the invention as well as concrete embodiments of the invention may be derived from the following description in connection with the drawing, in which.

DETAILED DESCRIPTION

In the following, the invention will be described in further detail by means of a webpage in HTML format, which is being displayed in an internet browser or web browser. The method according to the invention may, however, also be carried out on mobile terminals, as smartphones or tablet computers, on which electronic documents not necessarily are displayed in HTML format. For example, electronic documents and advertising contents to be embedded therein may be displayed in a so-called "app" on a mobile terminal. Of course, also webpages and advertising contents may be displayed by means of a mobile internet browser on mobile terminals. The method according to the invention, therefore, is also suitable for preventing a delivery of advertising contents and/or advertising means in so-called apps as well as in mobile internet browsers.

Figure 1:
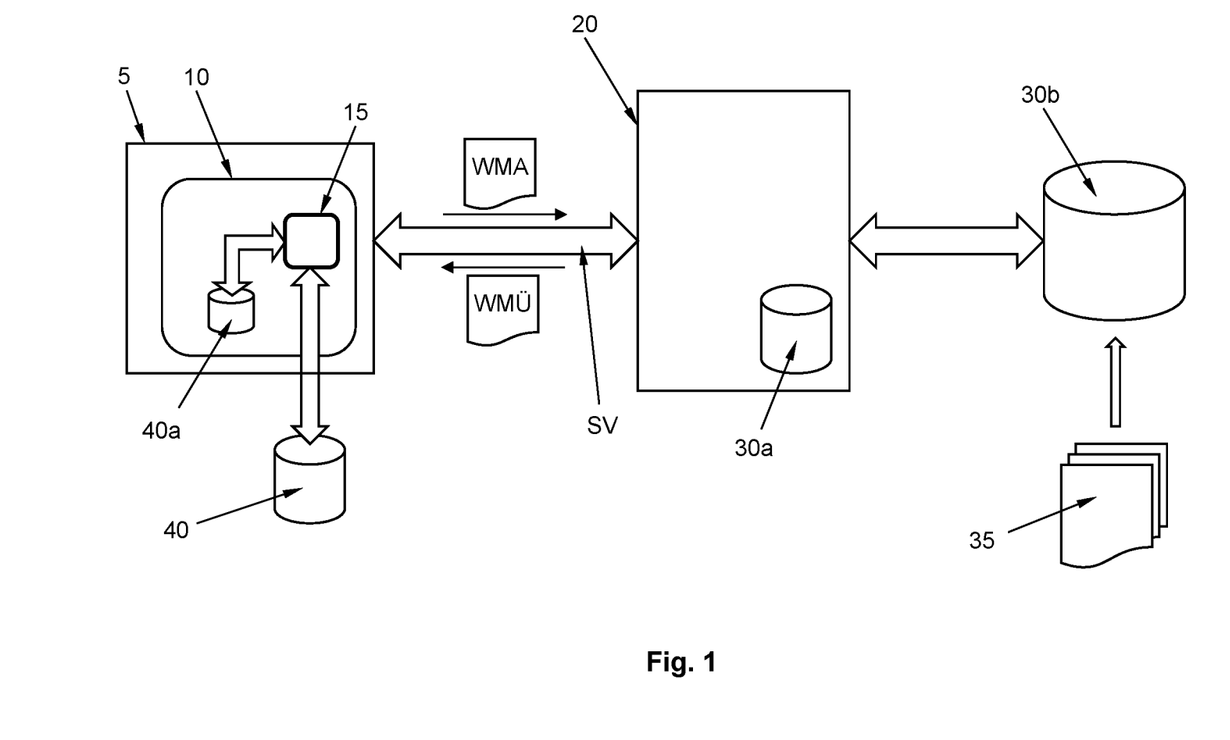
FIG. 1 shows a system for delivering advertising contents or advertising means, which for the delivery of advertising contents uses the WebSocket protocol.

FIG. 1 shows a system for delivery of advertising contents by means of which the inventive method for preventing a delivery of advertising contents is illustrated.

In client software 10, which is being executed on a client device 5 and which here is configured as internet browser or web browser, electronic documents, as HTML documents, are being displayed. The displayed HTML document or the HTML document to be displayed is requested by a so-called web server (not shown in FIG. 1), and is transmitted to the client device 5. In the HTML document, so-called client scripts (as JavaScript functions) may be embedded, which during the loading of the HTML document or after the loading of the HTML document are being executed. The client scripts establish a socket connection SV from the client device 5 to the socket server 20. The socket server 20 may be, for example, a server device being adapted to establish socket connections to client devices.

The client script sends an advertising means request message WMA to the socket server 20 via the socket connection SV, wherein a WebSocket protocol, for example, the WebSocket protocol or the Secure WebSocket protocol according to the standard RFC 6455 is used for this. In the following, if the WebSocket protocol is mentioned, this always refers to WebSocket protocol and/or Secure WebSocket protocol.

For the addressing of the socket server 20, the client script requires a so-called Uniform Resource Identifier (URI). By means of the URI, the socket server 20 is addressed uniquely.

The advertising means request message WMA comprises one or more identifiers, which identify the advertising means or advertising contents to be incorporated or embedded.

After the advertising means request message WMA has been transmitted from the client software 10 to the socket server 20, the advertising means request message WMA is evaluated by the socket server 20. In the embodiment of the system shown here, the socket server 20 requests from an advertising means server 30a or from an advertising means database 30b the advertising means or advertising contents requested in the advertising means request message WMA.

The requested advertising means or advertising contents are transmitted by means of an advertising means transmission message WMÜ from the socket server 20 to the client software 10 or to the internet browser 10. The internet browser 10 receives the advertising means transmission message WMÜ and inserts the advertising contents contained in the advertising means transmission message WMÜ into the HTML document displayed in the internet browser 10.

A number of advertising means or advertising contents 35 may be stored in the advertising means database 30b.

In an alternative embodiment of the system, the client software 10 or the client script may also establish a socket connection based on the WebSocket protocol to the advertising means server 30a directly, wherein the advertising means server 30a receives the advertising means request message WMA and generates the corresponding advertising means transmission message and transmits it to the client software 10.

The client software 10 comprises an advertising blocker 15 according to the invention, which may be realized as plug-in to the client software 10, for example, as plug-in for an internet browser. Alternatively, the advertising blocker 15 may also be realized as toolbar, for example, as toolbar for an internet browser. In an alternative embodiment, the advertising blocker 15 may also be provided by the operating system of the terminal on which the client software runs, or may be implemented as operating system function.

Independently of whether the advertising blocker 15 is realized as plug-in, as toolbar, or as operating system function, the advertising blocker 15 is adapted to monitor attempts to establish a connection from the client device to a server device, which use the WebSocket protocol. The advertising blocker, for this, may register a listener to attempts to establish a connection, which use the WebSocket protocol. As soon as an attempt to establish a connection has been carried out via the WebSocket protocol, a corresponding event is triggered, which is processed by a program or separate routine assigned to the event. The event comprises the Uniform Resource Identifier URI used for the attempt to establish a connection as parameter, which is handed over to the subroutine processing the event.

By means of deposited rules or filtering rules, which may be stored as global filtering rules 40 in a further server device or database or as local rules 40a in the client device the subroutine or the advertising blocker 15 checks, whether this Uniform Resource Identifier may be used for a connection establishment. If this check results in this Uniform Resource Identifier not being allowed to be used for a connection establishment, the attempt to establish a connection is blocked or terminated by the advertising blocker 15. The blocking of the attempt to establish a connection, thereby, is carried out by the advertising blocker via a programming interface (API), for example, of the internet browser.

By the blocking of the attempt to establish a connection or the connection establishment from the client software 10 to the socket server 20, or to the advertising means server 30a, it is prevented that advertising contents are transmitted from the socket server 20 or from the advertising means server 30a to the client software 10 and displayed there. Thereby, on the one hand, it is achieved that, for example, a requested HTML document is substantially free of advertising inserts. On the other hand, it is achieved that the data amount to be transmitted to the client device is kept as low as possible, being specifically advantageous with respect to mobile terminals.

It is important that according to the invention only such attempts to establish a connection to a socket server or to an advertising means server are checked and, if needed, are prevented, which use the WebSocket protocol.

The method for preventing a delivery of advertising contents is described in further detail in the following with reference to FIG. 2 and FIG. 3.

Figure 2:
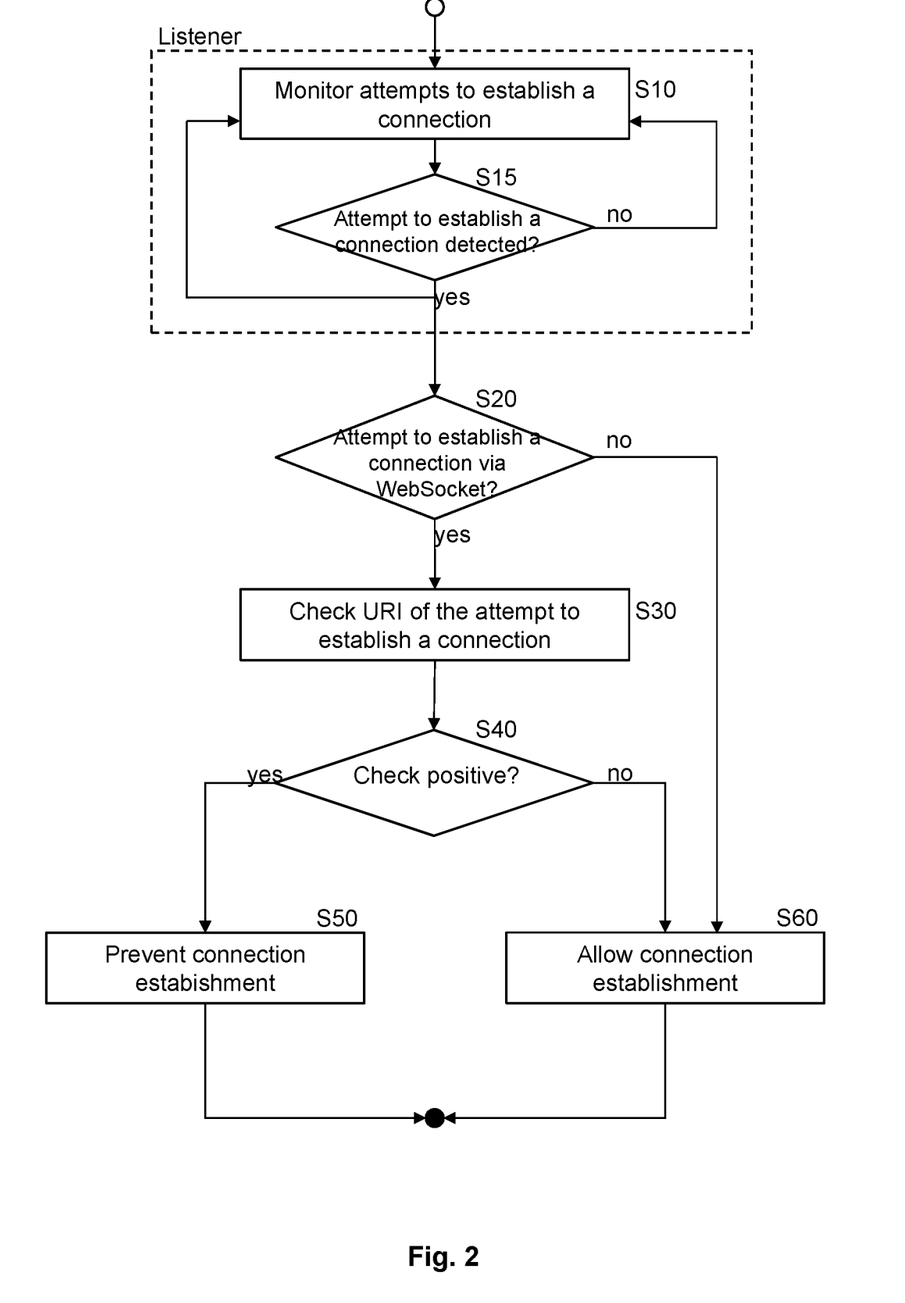
FIG. 2 shows a flow chart of a method according to the invention for preventing a delivery of advertising contents and/or advertising means to a client device.

FIG. 2 shows a flowchart of the method for preventing a delivery of advertising contents and/or advertising means according to the invention from a server device to a client device.

In a first step S10, attempts to establish a connection from the client device to the server device are monitored. If an attempt to establish a connection is detected, which is checked in the step S15, the method, on the one hand, is continued by the step S20, and, on the other hand, the method is continued by the step S10, by means of which it is further monitored whether further attempts to establish a connection occur.

The steps S10 and S15, here, are carried out by a listener, which is registered for monitoring of connection establishment events in the client software, for example, in an internet browser. The registration of the listener at the internet browser may, for example, result from a programming interface (API) being provided by the internet browser. This programming interface may comprise, for example, a programming interface for plug-ins.

In an alternative embodiment, the listener may also be registered with the operating system of the client device such that not only attempts to establish a connection of an internet browser may be monitored, but rather also attempts to establish a connection, which are performed by other application programs. As soon as the internet browser provides a request to a server device or to an advertising means server, a corresponding event is triggered, which is recognized in the step S15. This event, as a parameter, provides a Uniform Resource Identifier URI, which stores the address of the server device or of the advertising means server.

After the attempt to establish a connection has been detected and a corresponding event has been triggered, in step S20 it is checked, whether the WebSocket protocol is used for the attempt to establish a connection. For this, various parameters of the attempt to establish a connection or of the protocol used for the attempt to establish a connection may be evaluated. Alternatively, also various parameters or components of the URI of the attempt to establish a connection may be evaluated. For example, the URI of the attempt to establish a connection may be evaluated, for example, the scheme notation which determines the access method may be evaluated in the URI.

If in the step S20 it is determined that the attempt to establish a connection is not executed via the WebSocket protocol, the method branches off to the step S60 and instructs the advertising blocker to allow the connection establishment.

If, however, in the step S20 it is determined that the attempt to establish a connection takes place via the WebSocket protocol, in the subsequent step S30 it is checked, if the URI used in the attempt to establish a connection has been used for a connection establishment. The substeps carried out in the step S30 are further explained with reference to FIG. 3.

In the step S40 subsequent to the step S30, it is checked, whether the result of the check carried out in the step S30 is positive. In case this check is positive, the advertising blocker, in the subsequent step S50, instructs that the connection establishment is prevented or is cancelled. A check may be, for example, positive in a case, in which the address of the server device or the advertising means server indicated in the URI of the attempt to establish a connection may not be used for a connection establishment.

In contrast, if the check is negative, the connection establishment to the address indicated in the URI is allowed in the step S60.

Accordingly, in the method according to the invention, at first it is checked, whether the client software uses the WebSocket protocol during the attempt to establish a connection to a server device. If the WebSocket protocol is used, according to the invention it is checked subsequently, whether the address used in the URI of the attempt to establish a connection is admitted for the establishment of the connection, and if the address for the connection establishment is not allowed, the attempt to establish a connection is aborted such that a communication from the client software to the server device or to the advertising means server does not occur. Thereby, it is prevented that advertising contents or advertising means may be delivered from a server device or from an advertising means server to the client software in order to be displayed there. The volume of the data to be transmitted to the client device or to the client software may be reduced substantially.

By the check of the URI in the step S30, moreover, certain addresses may be allowed for a connection establishment, even if the connection establishment to such an address is executed via the WebSocket protocol. For example, such addresses may be allowed for a connection establishment via the WebSocket protocol, which are rated as being particularly trustworthy. Alternatively, also such addresses may be allowed for the connection establishment via the WebSocket protocol, the providers of which meet certain properties or requirements. Such properties or requirements may be, for example, that the provider or proprietors of these addresses pay a one-time or regular fee to the editor of the advertising blocker.

Alternatively, attempts to establish a connection via the WebSocket protocol may also be prevented, if the user of the advertising blocker pays a one-time or regular fee to the editor of the advertising blocker.

In an embodiment of the invention, the steps S10, S15, and S20 of the method shown in FIG. 2 may be carried out optionally or may not be carried out at all. Thereby, it is possible to prevent the delivery of advertising contents, if an existing WebSocket connection to a server device already is present or is established.

Figure 3:
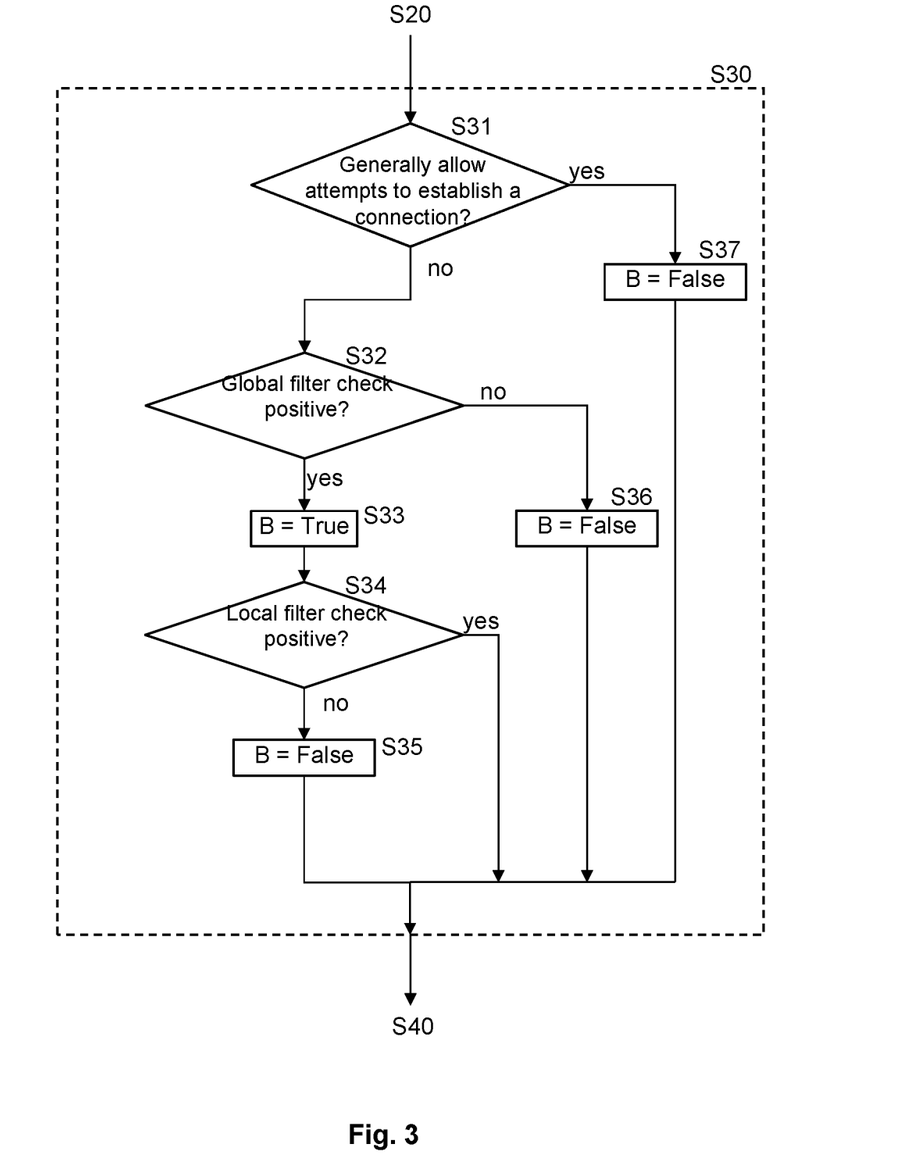
FIG. 3 shows a flow chart for step S30 shown in FIG. 2.

FIG. 3 shows a possible flow chart of the method steps carried out in the step S30.

In a step S31, at first it is checked, whether the attempts to establish a connection are allowed in general. If the attempts to establish a connection are generally al-lowed, a variable B (blocking) is set to false in the step S37. In the other case, namely, if attempts to establish a connection are not allowed in general, the method or the step S30 is continued with the step S32.

Attempts to establish a connection may not be allowed in general in such cases, in which the user of the advertising blocker, for example, pays a one-time or a regular fee to the editor of the advertising blocker. If the attempts to establish a connection are not allowed in general, the method may be continued with the step S40 after the step S31, in which then it is determined that the check has been positive in the step S30 such that the connection establishment is prevented in the step S50.

In the sequence shown in FIG. 3, for the case that attempts to establish a connection are generally not allowed, it is continued with step S32. In the step S32 it is then checked, whether a global filter check is positive. During the global filter check, it may be checked, whether the address indicated in the URI of attempt to establish a connection meets certain global filter criteria or filtering rules, which are stored, for example, in a further server device. For example, addresses may be deposited as global filtering rules. If the address of the URI of the attempt to establish a connection coincides with the deposited address, the global filter check may be considered as being positive, i.e., this address is not allowed to be used for a connection establishment.

The comparison with the addresses deposited in the global filtering rules may be carried out on the basis of the plain text of the address, or on the basis of the IP address. Further, also certain regular expressions may be used for the comparison. This also applies for the local filtering rules described in the following.

The global filtering rules may be provided and/or maintained, for example, by the editor of the advertising blocker. For example, addresses of server devices or advertising means service may be deposited as global filtering rules, which are intended for providing advertising contents for a delivery to, for example, a webpage. By means of the global filtering rules, the possibility is provided that a number of or all known advertising means servers may be collected at a central location such that the advertising blocker only has to access this global filtering rules in order to check, in the step S32, whether a filter check is positive. In particular, the advantage is that the global filtering rules may be identical for all advertising blockers according to the invention.

According to an embodiment of the invention, certain addresses of advertising means servers, may be, however, removed from the global filtering rules, if, for example, the providers of these addresses pay a one-time or regular fee to the provider of the advertising blocker.

A global filter check may also comprise the possibility that for certain users of the advertising blocker according to the invention, the global filter check is positive, even if the address comprised in the URI is deposited in the global filtering rules, for example, if the user has not paid a fee to be paid for blocking advertising contents. In this case, the attempt to establish a connection would not to be interrupted, even if the address used is comprised in the global filtering rules.

If the global filter check carried out in the step S32 leads to a positive result, the variable B is set to true in the next step S33. Otherwise, the variable B is set to false in the step S36.

Subsequent to the step S36, the method is continued with the step S40 in the example shown here.

Subsequent to the step S33, in which the variable B is set to true, it is continued with the step S34, in which a local filter check is performed. With respect to the example shown here, by means of the local filter check S34 it is checked, whether the address used in the attempt to establish a connection corresponds to local filtering rules, which are stored in the client device. The local filtering rules may comprise, for example, addresses of advertising means servers for which no connection establishment can or may be carried out. The local filtering rules may also comprise addresses of advertising means servers, for which a connection establishment is allowed to be carried out, for example, because the addresses are rated as particularly trustworthy, or because the web contents, which may be requested by this address, are considered to be sparsely intrusive.

If the local filter check does not lead to a positive result in the step S34, in the step S35, the variable B is set to false, i.e., for the address indicated in the URI no attempt to establish a connection is allowed. Otherwise, thus, if the local filter check has been positive, the variable B maintains the value set in the step S33, thus, the value true in the present example. In both cases, the method is continued with the step S40.

The local filter check in the step S34 is carried out after the global filter check in the step S32 in the present case. This has the advantage that a higher weight may be allocated to the local filter check than to the global filter check. For example, the global filter check may provide the result that an attempt to establish a connection is allowed for a certain addresses, whereas on the basis of the local filter check, a connection establishment attempt is not allowed for exactly this address, or vice versa. Thus, certain addresses may be blocked, for example, due to the local filter check, whereas some of these blocked addresses are allowed for a connection establishment due to the global filter check. This checking sequence is advantageous, for example, if users of an advertising blocker according to the invention have the possibility to block certain addresses for the receipt of advertising contents by paying fees to the provider of the advertising blocker. These addresses may be stored as local filtering rules at the users of the advertising blockers, who have paid the corresponding fee.

As an alternative to the fees to be paid, it may also be provided for certain addresses of advertising means servers being blocked in such cases, where the user of an advertising blocker has registered himself as follower of a certain profile of a social network.

According to an embodiment of the invention, the advertising blocker may provide for a unique identifier of a user being deposited there. During the check, if an address meets, for example, a global filter criterion, this unique identifier of the user may be transmitted to the server device, which carries out the check of the address. Then, for checking the address, a unique user identifier may be considered, in order to determine, for example, whether the user has paid the required fees, or whether the address is inadmissible or admissible for the user for a connection establishment to an advertising means server due to other criteria.

The value of variable B set in the step S30 may be evaluated in the step S40. In case the variable B has the value true, the checking will arrive at a positive result in the step S40 such that the connection establishment is prevented in the step S50. Otherwise, thus, if the value of the variable B is false, the checking in the step S40 will not arrive at a positive result such that the connection establishment will be allowed to the corresponding address, leading to the transmission of advertising contents to the client device from this address.

By means of the present invention, it is possible to block advertising contents, which are to be requested based on the WebSocket protocol of an advertising means server such that a communication to the advertising means server will not be realized, and thereby, also no advertising contents will be transmitted to the client device. Nevertheless, it is possible, as far as certain requirements are met, that advertising contents of certain advertising means servers or for certain users of the advertising blocker, nevertheless can be transmitted to the client device and may be displayed there. For which users which advertising means servers are to be blocked or are not to be blocked may be determined by means of the global and local filtering rules in a specifically variable manner.

The advertising blocker may be provided according to the invention as plug-in or as toolbar of an internet browser. According to an alternative embodiment, the advertising blocker may also be provided as operation system function of an operation system, for example, as service being executed in the background.

Above, the method according to the invention has been described according to which it is checked, whether the WebSocket protocol is used. Instead of the check, whether the WebSocket protocol is used, it may also be checked, whether the HTTPS protocol is used.

The advertising blocker may be provided by the provider of the advertising blocker for download such that it is up to the user, whether he is willing to download or install this advertising blocker as plug-in, or as toolbar, or as service running in the background.

REFERENCE NUMERALS 5 client device
10 client software (e.g. browser for displaying webpages)
15 advertising blocker, e.g. as plug-in
20 socket server (server device being adapted to establish a socket connection to the client software)
30a advertising means server (e.g. server device comprising a database and/or database server of the socket server)
30b advertising means database
35 advertising means and/or advertising contents
40 global filtering rules (being provided, e.g., by a server device having a database, e.g. as web service)
40a local filtering rules
S10 to S60 steps of the method
SV socket connection between the client device and the socket server
WMA advertising means request message
WMÜ advertising means transmission message

What is claimed is:

1. A method for preventing a delivery of advertising contents or advertising means (35) from a server device to a client device (5), the method comprising:
    (a) monitoring, by an advertising blocker (15) of the client device, attempts to establish a connection of the client device (5) to the server device (S10),
    (b) in the event of a detected attempt to establish the connection (S15), determining, by the advertising blocker (15), if any WebSocket based communications protocol is used, which is provided for the establishment of a full-duplex connection between the server device and the client device (S20),
    (c) if any WebSocket based communications protocol is used for the attempt to establish the connection, checking, by the advertising blocker (15), for an Uniform Resource Identifier (URI) of the attempt to establish the connection, and determining, by the advertising blocker (15), whether the URI may be used for the connection establishment (S30), and
    (d) if the result of the checking (S30) is that the Uniform Resource Identifier (URI) may not be used for the connection establishment (S40), ending, by the advertising blocker (15), the attempt to establish a connection (S50), and if the result of the checking is that the URI may be used for connection establishment, allowing, by the advertising blocker (15), the attempt to establish a connection to the server device (S60),
    (e) if the detected attempt to establish the connection (15) is determined not to use any WebSocket based communication protocol, admitting without any further check, by the advertising blocker (15), the attempt to establish the connection to the server device (S60).

2. The method of claim 1, wherein the checking, by the advertising blocker (15), for the URI of the attempt to establish the connection, and determining, by the advertising blocker (15), whether the URI may be used for the connection establishment (S30) further comprises:
    checking, by the advertising blocker (15), whether attempts to establish the connection are allowed in general (S31), wherein during checking whether attempts to establish a connection are allowed in general (31), transmitting, by the advertising blocker (15), a unique identifier stored in the client device (5) to a third-party server, and receiving, by the advertising blocker (15), a return message as response to the transmitted unique identifier from the third-party server comprising information on whether the check is positive.

3. The method of claim 2, wherein the unique identifier comprises a user identification.

4. The method of claim 1, wherein during the checking, by the advertising blocker (15), for the URI of the attempt to establish the connection, and determining, by the advertising blocker (15), whether the URI may be used for the connection establishment (S30), the advertising blocker (15) performs, a global filter check (S32) to determine whether the URI meets one or more global filtering rules (40), and in response to determining the result of the global filter check is positive, the advertising blocker (15) ends the attempt to establish the connection.

5. The method of claim 4, wherein during the global filter check (S32), the advertising blocker (15) transmits the URI to the server device, in which the one or more global filtering rules (40) are stored, and wherein the advertising blocker (15) receives a message from the server device, the message comprising information on whether the URI meets the one or more global filtering rules (40).

6. The method of claim 5, wherein during the checking, by the advertising blocker (15), for the URI of the attempt to establish the connection, and determining, by the advertising blocker (15), whether the URI may be used for the connection establishment (S30), the advertising blocker (15) performs a local filter check (S34) to determine whether the URI meets one or more local filtering rules (40a), and in response to determining the result of the local filter check is positive, the advertising blocker (15) ends the attempt to establish the connection.

7. The method of claim 6, wherein the one or more local filtering rules (40a) are stored in the client device (5).

8. The method of claim 6, wherein the global filter check (S32) is carried out prior to the local filter check (S34).

9. The method of claim 1, wherein the server device comprises an advertising means server (30a), an advertising means database (30b), or a socket server (20) which are adapted to establish a socket connection to the client device (5).

10. The method of claim 1, wherein the advertising blocker (15) comprises a plug-in and/or a toolbar.

11. The method of claim 1, wherein the monitoring, by the advertising blocker (15) of the client device, attempts to establish a connection of the client device (5) to the server device (S10) is carried out by an event listener having been registered with the client device for the connection establishment events.

* * * * *